Jan. 12, 1943.                L. W. STETTNER                 2,308,124
                       AERONAUTICAL OXYGEN REGULATOR
                        Filed April 5, 1941        2 Sheets-Sheet 1

INVENTOR.
LUDWIG W. STETTNER
BY
ATTORNEY.

Jan. 12, 1943.  L. W. STETTNER  2,308,124
AERONAUTICAL OXYGEN REGULATOR
Filed April 5, 1941  2 Sheets-Sheet 2
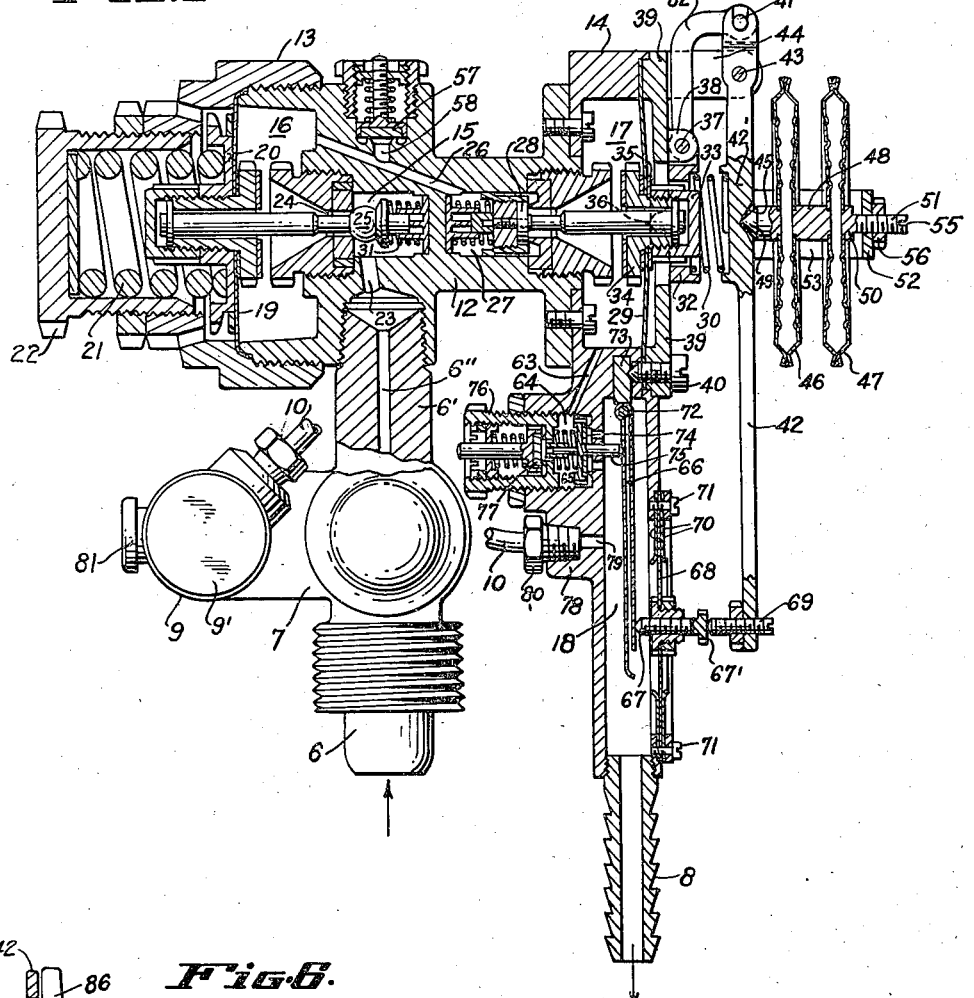
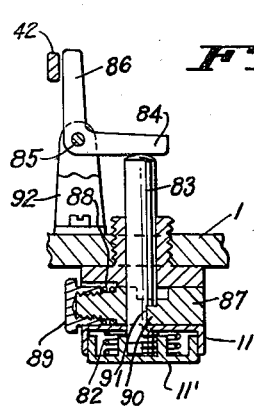
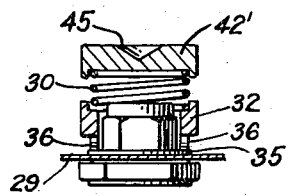
INVENTOR.
LUDWIG W. STETTNER
BY
ATTORNEY.

Patented Jan. 12, 1943

2,308,124

UNITED STATES PATENT OFFICE 2,308,124

AERONAUTICAL OXYGEN REGULATOR

Ludwig W. Stettner, Piedmont, Calif., assignor to Victor Equipment Company, San Francisco, Calif., a corporation of Delaware Application April 5, 1941, Serial No. 387,038

9 Claims. (Cl. 128—191)

This invention relates to oxygen pressure regulators and has for its principal object improvements in the demand-type oxygen regulator as used by aviators in high altitude flying, and whereby the delivery of oxygen will automatically increase as the atmospheric pressure falls, and which apparatus will be very sensitive yet not likely to get out of order but which will incorporate instantaneously operated safety features for use in event something does go wrong with the regular delivery of oxygen to the aviator's helmet. Specific features and advantages of the invention will appear in the following description and accompanying drawings.

In the drawings:

Fig. 4 is a greatly enlarged plan of the apparatus shown generally in horioznatal central section, though with some features in full and others broken away so as to best reveal the operative relation of the parts.

Fig. 5 is a fragmentary sectional view of the diaphragh operating yoke member of Fig. 4 taken at right angles thereto.

Fig. 6 is a sectional detail of the emergency and crank arrangement for manually operating the last two pressure reducing stage valves.

Figure 1:
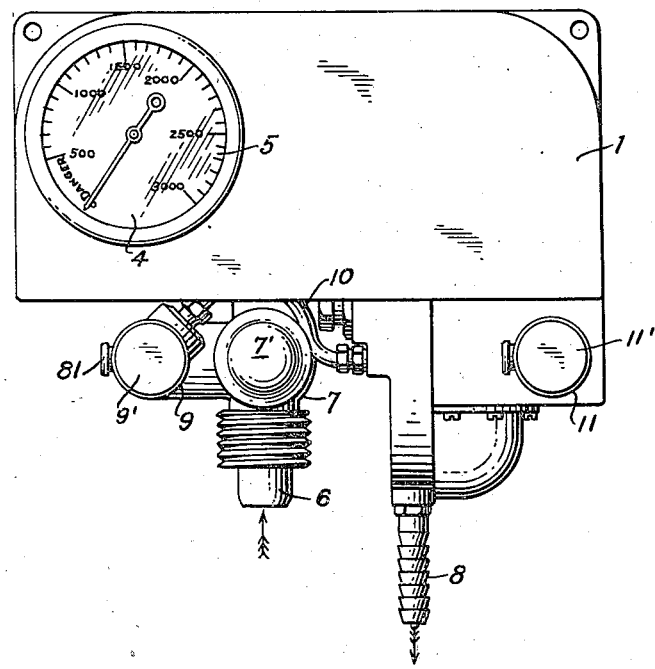
Fig. 1 is a plan view of a demand-type oxygen pressure regulator embracing the improvements of my invention.

Briefly described, the apparatus may be said to comprise a multi-stage gas pressure reducing regulator of diaphragm type with an aneroid controlling the last stage, and push-button operated means for by-passing a restricted flow of oxygen directly from the high pressure zone to the breathing chamber.

In the drawings, 1 designates the front wall of a box enclosing the operating parts of the apparatus, 2 is a side wall of the box, and 3 the rear wall. In the front wall of the box is a circular opening fitted with a glass or other transparent sheet 4 exposing to view the disk 5 of a pressure gauge which connects with the high pressure side of the gas as will be later described.

Projecting from the forward side wall of the box is a threaded high pressure tubular inlet oxygen coupling connection 6 with a shut-off valve 7 the operating knob of which is shown at 7', and a low or breathing pressure oxygen tubular outlet connection 8 formed to receive the rubber hose from an aviator's oxygen mask or helmet, not shown.

Also accessible outside of the box is a normally spring closed push-button by-pass valve 9 for opening a restricted passage from the high pressure oxygen direct to the low pressure breathing chamber through a pipe 10, and another push-button device 11 for tripping the second and third pressure reduction stage, all of which will be later more completely described.

The high pressure inlet connection 6 extends beyond its shut-off valve 7 as at 6' and screws into a threaded opening in the regulator body, the inlet gas passage being indicated at 6''. The body is composed of several sections 12, 13, 14 formed to provide a high pressure valve chamber 15, a first pressure reduction chamber 16, a second pressure reduction chamber 17 and a final or breathing pressure chamber 18. Chamber 15 receives gas from passage 6'' by way of a passage 23, and from chamber 15 the gas passes through a port 24 to chamber 16 under control of a ball valve 25 gently urged toward closing position by a light spring 31.

Chamber 16 is closed on one side by a flexible diaphragm 19 backed by a floating plate 20 and a coiled compression spring 21 the pressure of which is controlled by a threaded hollow nut 22, and the movement of the diaphragm controls the opening and closing of the ball valve 25 in the well known way (substantially as in the regulator valve arrangement shown in my U. S. Patent No. 2,156,823), and the details of construction not being novel nor claimed herein will not further be described.

From chamber 16 a passage 26 extends to a second valve chamber 27 in which is reciprocably mounted a disk valve 28, the opening and closing movements of which are controlled by the flexible movements of a diaphragm 29 closing one side of chamber 17 in the same general manner as described for valve 25 except that the pressure controlling coiled compression spring 30 is not enclosed in a hollow adjusting nut as is spring 21 but is seated at its inner end in a socket formed in a yoke member 32 which loosely embraces a hollow nut 33 which screws over the outer end of the diaphragm hub member 34 against a washer 35 at the outer side of the diaphragm 29. Yoke member 32 is formed with two rounding lugs or legs 36 which bear upon washer 35 at opposite sides of hollow nut 33, and the yoke is the inner or short end of a lever 32' pivoted at 37 to a pair of lugs 38 projecting outwardly from a rigid cover plate 39 secured over the outer side of chamber 17 as by screws 40 which also clamp the diaphragm 29 in position.

The outer or long end of lever 32' is turned at right angles and pivoted at 41 to the short end of a long straight lever 42 in turn pivoted at 43 to another pair of lugs 44 projecting from cover plate 39. Long lever 42 is provided with a socket portion 42' in confronting but spaced relation to the socket of yoke member 32 and receives the other end of spring 30.

Figure 2:
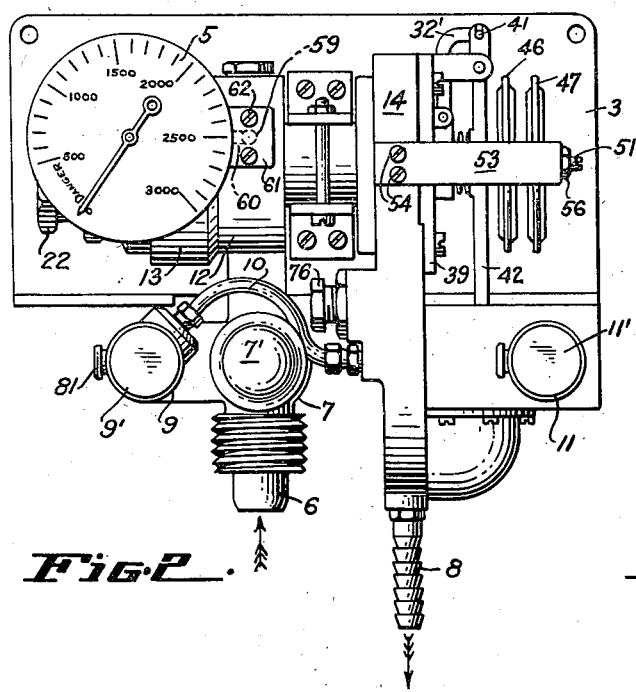
Fig. 2 is a plan view of the apparatus with the forward casing shell removed to show the general arrangement of parts.
Figure 3:
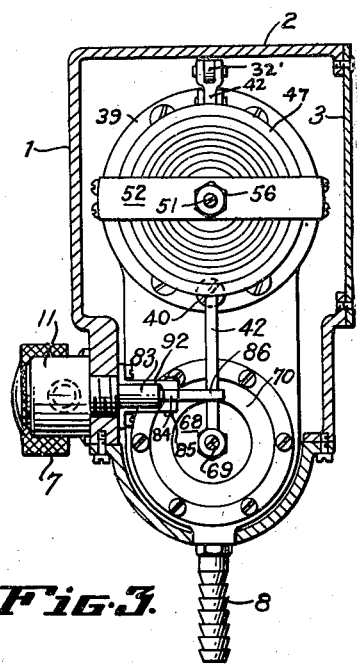
Fig. 3 is a right-hand end view of Fig. 2, but showing the casing in position, though with the near end wall omitted.

At the outer side of lever 42 and centered over socket 42' is a depression or seat 45 and aligned over which are a couple of aneroid casings 46, 47 preferably made of thin flexible corrugated sheet metal spaced disks sealed at their margins and filled with air or gas at about atmospheric pressure. These aneroids are separated by a connecting hub 48 which is sealed to the adjacent walls of the aneroids, and the inner one 46 has a substantially pointed hub 49 seated in depression 45 of lever 42, while the outer one 47 has its hub 50 elongated into the form of a threaded rod 51 screwed through on opening in a bracket 52 which straddles the aneroids and has two supporting legs 53 which are secured as by screws 54 to the body section 14 (see Fig. 2). The outer end of threaded rod 51 is slotted as at 55 for a screwdriver for adjusting the pressure of the aneroids upon lever seat 45, and a check nut 56 is provided for locking them in adjusted position.

Returning now to gas passage 26, an adjustable spring seated relief or safety valve 57 of any suitable construction is provided on the regulator body portion 12 and opens at 58 to passage 26. At this part of the drawing it may be stated that pressure gauge 5 which is of conventional type is exposed to the high pressure of chamber 15 through means of a port in the side of body portion 12 indicated in dotted lines at 59 in Fig. 2 and which connects to a suitable matching port 60 in the foot or securing lug 61 of the gauge which is held in place on the body 12 as by screws 62.

From the second reduction stage chamber 17 the gas flows through a passage 63 to a valve chamber 64 which communicates with the third or breathing pressure chamber 18 by way of a reciprocably mounted valve 74 which is gently urged toward closed position by a light compression spring 65 through substantially balanced (at normal atmospheric pressure) against the force of a thin spring lever 66 moved more or less by a pin or screw 67 secured to the center of a flexible diaphragm 68 and which pin is normally operated by movement of the outer or long end of lever 42 which is provided with an adjusting screw 69 which impinges at its inner end against the outer end 67' of screw 67.

Diaphragm 68 is very thin and sensitive and is provided with flexing limit guard plates 70 on opposite sides and is secured around its margin over an opening in the outer wall of breathing stage chamber 18 as by screws 71.

Lever 66 is a long strip of spring metal bent upon itself and pivoted at the bend at 72 to a pivot carried by a loose block 73 conveniently held in place by one of the screws 40 which hold cover plate 39 in place, and the outer arm of the spring lever is impinged by screw 67 near the outer end of the lever, while the inner arm of the spring lever engages the stem 75 of valve 74 so as to force the valve open when lever 42 moves inwardly.

Valve chamber 64 is closed on its outer end by a screw plug 76 embodying within it an adjustable spring safety or relief valve 77 of any suitable construction arranged to be set for opening at any desired maximum pressure in chamber 64.

Adjacent the relief valve member 76 is a hub or boss 78 formed on the breathing chamber wall and which is ported as at 79 to the breathing chamber and to which port the high pressure by-pass tube 10 connects by means of a suitable threaded nipple 80 so that in emergency a simple push upon the large button 9' of the push-button valve 9 will at once admit high pressure oxygen to the breathing chamber. The push-button valve is of the spring closed type which is provided with a smaller spring actuated push button or latch 81 which, when the valve 9 is opened by a push upon the large button 9', springs outward and locks the valve open until another push upon the small button 81 releases the latch and permits the large button to spring outward again and close the valve. As this double push-button valve is shown, described and claimed in a copending patent application of one Richard F. Heinemann, filed under Serial No. 372,872, assigned to the assignee of the present application, no detailed drawing of the valve is incorporated herein, except to say that the aperture of the valve passageway is made so small or restricted as to just pass somewhat more oxygen than required for the user, any excess finding escape through relief valve 77.

As a further emergency safeguard a push button device for operating lever 42 is provided. This device is designated 11 (see Fig. 6) and it also has two push buttons, one, 11' a large one normally urged outward by a spring 82 and which button is provided with a slidable stem 83 which acts against one arm 84 of a bell crank pivoted at 85 to a fixed point such as to a bracket 92 projecting from the box 1, and the other arm 86 of the crank acts against the outer side of lever 42, all in a manner so that when push button 11' is pushed inward, lever 42 will be depressed and thereby open valve 28 to chamber 17 and also valve 74 to breathing chamber 18. When push button 11' is thus depressed a spring actuated locking pin 87 acting under the force of a coiled compression spring 88 moves (to the left in Fig. 6) and instantly locks button 11' in depressed position until a push upon a smaller push button 89 secured to the end of pin 87 releases the large button to spring outward again to its normal position. The locking is effected by the engagement of a lug 90 of pin 87 with a corresponding notch 91 in stem 83.

The general construction and action of the push buttons and the small one locking the large one until released by a second push, is identical with that of by-pass valve 9 except that the stem of the large button moves the valve instead of a rocker arm.

In actual use, in an emergency requiring more oxygen the large button of device 11 will be operated first, but if for some reason (due to possible mechanical injury to some of the parts) there is not sufficient, or no response, the aviator at once pushes the large button of device 9 and gets the required oxygen immediately.

From the preceding description of the parts and their purposes, it is thought the operation of the apparatus will be clearly understood, as the two pressure reducing regulator stages 16 and 17 operate in the conventional way except that the control of stage 17 instead of being effected by a screw (51) directly acting against a balancing spring (30) is carried out through the intermediary of a pair of superimposed aneroid chambers 46 and 47 in turn acting through a compound leverage system 42 and 32 (on the nature of a compound weighing scale) before reaching the spring 30. With proper adjustment of the screw 51 the apparatus will remain closed against the delivery of oxygen at ordinary atmospheric pressure or up to any predetermined elevation, and above which elevation the expansion of the aneroids will automatically open both stage 17 as well as the breather stage valves and supply oxygen to the aviator in a gradually increasing rate as the altitude increases. The special construction of the control of stages 17 and 18 make the apparatus extremely sensitive yet assure a high degree of reliability. While the apparatus will operate with but one aneroid, the provision makes the apparatus more sensitive, and also enables the apparatus to function should one aneroid accidentally spring a leak.

The provision of two double push-button emergency devices each with a large push button for first operation and with a small push button for release of the large one is highly important in an apparatus for which this is intended, for it enables the aviator to tell instantly by touch alone what is being done, and requires but a simple push of a button and which under certain emergency conditions might be all, or the final effort of which he was capable.

In considering the invention as set forth it will be seen that it does not embrace the illustrated details of the ordinary pressure reducing regulators, but, while it does include some of the sensitive control features, the principal claims to invention are concerned with the general arrangement and cooperation of the various parts whereby the advantages enumerated are achieved.

I therefore claim:

1. In a demand-type oxygen pressure reducing regulator, a plurality of pressure reducing stages including a final breathing stage, a balancing spring for controlling the pressure of the stage immediately preceding the breathing stage, a lever for applying pressure to said spring, a pair of aligned superimposed aneroids arranged to cooperate to move said lever under varying atmospheric pressure, a frame embracing and sustaining the aneroids while holding them free for axial sliding movement, and means for adjusting the aneroids bodily along the frame to vary their pressure on said lever.

2. In a multi-stage demand-type oxygen pressure reducing regulator, a final breathing stage comprising an oxygen chamber arranged for connection to a breathing mask or helmet, an oxygen inlet valve on said chamber from a preceding stage, a flexible diaphragm constituting a portion of the wall of the chamber, a stud projecting inwardly from the diaphragm into the chamber, a lever formed of a thin flexible strip pivotally mounted at one end in the chamber and in operative contact adjacent its outer free end with said stud, and means operating said valve from a point on said flexible strip adjacent its pivotal point.

3. In a multi-stage demand-type oxygen pressure reducing regulator, a final breathing stage comprising an oxygen chamber arranged for connection to a breathing mask or helmet, an oxygen inlet valve on said chamber from a preceding stage, a flexible diaphragm constituting a portion of the wall of the chamber, a stud projecting inwardly from the diaphragm into the chamber, a flexible lever pivotally mounted in the chamber and in operative contact adjacent its outer end with said stud, and means operating said valve from a point on said flexible lever adjacent its pivotal point, said flexible lever formed of a thin flexible strip doubled upon itself to form spaced legs with one in contact with said stud and the other operating said valve.

4. In a multi-stage demand-type oxygen pressure reducing regulator, a final breathing stage comprising an oxygen chamber arranged for connection to a breathing mask or helmet, an oxygen inlet valve on said chamber from a preceding stage, a diaphragm controlled inlet valve on said preceding stage from a preceding source of oxygen, a diaphragm controlling the oxygen inlet valve of the breathing chamber adapted to flex and open said inelt valve upon a user breathing oxygen from said chamber, and mechanically connected means operated by movement of the breathing chamber diaphragm operating the diaphragm controlled inlet valve of the preceding chamber.

5. In a multi-stage demand-type oxygen pressure reducing regulator, a final breathing stage comprising an oxygen chamber arranged for connection to a breathing mask or helmet, an oxygen inlet valve on said chamber from a preceding stage, a diaphragm controlled valve on said preceding stage, a diaphragm controlling the oxygen inlet valve of the breathing chamber adapted to flex and open said inlet valve upon a user breathing oxygen from said chamber, and means operated by movement of the breathing chamber diaphragm operating the diaphragm controlled valve of the preceding chamber, an aneroid operatively arranged in relation to said diaphragm controlled valve of the preceding chamber and the inlet valve to the breathing chamber to open both of them upon a fall in atmospheric pressure.

6. In a demand-type oxygen pressure reducing regulator, a plurality of successively lower pressure reducing stages including a final breathing stage and a controlling valve for and preceding each stage, a balancing spring for the valve controlling the pressure of the stage immediately preceding the breathing stage, a lever for applying pressure to said spring, an aneroid arranged to move said lever under varying atmospheric pressure to vary the pressure of said spring, and means also operated by said lever for controlling the valve immediately preceding the breathing stage.

7. In a demand-type oxygen pressure reducing regulator, a plurality of successively lower pressure reducing stages including a final breathing stage and a controlling valve for and preceding each stage, a balancing spring for the valve controlling the pressure of the stage immediately preceding the breathing stage, a lever for applying pressure to said spring, a pair of aligned superimposed aneroids arranged to cooperate to move said lever under varying atmospheric pressure to vary the pressure of said spring, and means also operated by said lever for controlling the valve immediately preceding the breathing stage.

8. In a demand-type oxygen pressure reducing regulator, a plurality of successively lower pressure reducing stages including a final breathing stage and a controlling valve for and preceding each stage, a balancing spring for the valve controlling the pressure of the stage immediately preceding the breathing stage, a compound lever system arranged for applying pressure to said spring, and said lever system including a pivoted lever with a long arm contacting said spring, and means also operated by said long arm of the lever for controlling the valve immediately preceding the breathing stage, and a finger operated means, for tripping said pivoted lever.

9. In a demand-type oxygen pressure reducing regulator, a plurality of successively lower pressure reducing stages including a final breathing stage and a controlling valve for and preceding each stage, a balancing spring for the valve controlling the pressure of the stage immediately preceding the breathing stage, a compound lever system arranged for applying pressure to said spring, and said lever system including a pivoted lever with a long arm contacting said spring, and means also operated by said long arm of the lever for controlling the valve immediately preceding the breathing stage, and a push-button operated means for tripping said pivoted lever.

LUDWIG W. STETTNER.